United States Patent [19]
Kato et al.

[11] Patent Number: 5,964,150
[45] Date of Patent: Oct. 12, 1999

[54] COUPLE OF GEAR WHEELS FOR DRIVING PRINTING DRUM WITH MEANS FOR MUTUAL PHASE RESTORATION

[75] Inventors: Hiroyasu Kato; Yasushi Kuratani, both of Ibaraki-ken, Japan

[73] Assignee: Riso Kagaku Corporation, Tokyo, Japan

[21] Appl. No.: 09/116,466

[22] Filed: Jul. 16, 1998

[30] Foreign Application Priority Data

Jul. 23, 1997 [JP] Japan ..................................... 9-212650

[51] Int. Cl.⁶ ...................................................... B41F 5/00
[52] U.S. Cl. ................................. 101/216; 74/409; 74/440
[58] Field of Search ....................... 74/409, 440; 101/216

[56] References Cited

U.S. PATENT DOCUMENTS

| | | | |
|---|---|---|---|
| 3,359,819 | 12/1967 | Veillette et al. | 74/409 |
| 3,974,710 | 8/1976 | Granger et al. | 74/465 |
| 4,072,104 | 2/1978 | Schaffer | 101/248 |
| 4,781,073 | 11/1988 | Bondhus et al. | 74/440 |
| 5,181,433 | 1/1993 | Ueno et al. | 74/409 |
| 5,586,499 | 12/1996 | Beaumont et al. | 101/211 |
| 5,771,745 | 6/1998 | Goette et al. | 74/440 |
| 5,836,246 | 11/1998 | Saito et al. | 101/216 |

FOREIGN PATENT DOCUMENTS

| | | | |
|---|---|---|---|
| 59-12893 | 1/1984 | Japan | 101/216 |
| 8-39918 | 2/1996 | Japan | 101/216 |
| 8-338500 | 12/1996 | Japan | 101/216 |

*Primary Examiner*—Edgar Burr
*Assistant Examiner*—Charles H. Nolan, Jr.
*Attorney, Agent, or Firm*—Oliff & Berridge, PLC

[57] ABSTRACT

In a couple of axially engageable/disengageable gear wheels for driving a printing drum, in which each gear wheel has a duplicate construction including a primary gear for transmission of a power for driving the printing drum and an auxiliary gear for suppressing a backlash, the primary gear and the auxiliary gear are shifted relative to one another in the phase, except a predetermined meshing area, so that the two duplicate gear wheels are allowed to disengage from and re-engage with one another only when the two gear wheels are rotationally positioned at a predetermined rotational relationship.

11 Claims, 5 Drawing Sheets

COUPLE OF GEAR WHEELS FOR DRIVING PRINTING DRUM WITH MEANS FOR MUTUAL PHASE RESTORATION

BACKGROUND OF THE INVENTION

1. Field of the Invention

The present invention relates to a couple of gear wheels for driving a printing drum, and more particularly, a couple of gear wheels for driving a printing drum, comprising a first gear wheel mounted on the printing drum, and a second gear wheel rotatably supported by a part of a machine body, the first and second gear wheels being adapted to mesh with one another when the printing drum is set at a printing position located inside the machine body, so as to drive the printing drum by a drive source provided in the machine body via the meshing engagement the gear wheels, and to dissolve the meshing engagement when the printing drum is axially moved from the printing position toward outside the machine body with the first gear wheel carried thereby.

2. Description of the Prior Art

In Japanese Patent Laid-open Publication 59-12839, there is shown a drum unit of a rotary stencil printer, comprising a frame which supports a cylindrical printing drum having a perforated circumferential portion to be rotatable about its central axis, together with ink supply means for supplying ink to the printing drum from its inside, a receiver for an ink container for supplying ink, and an ink pump, while the frame is supported and guided relative to a machine body of the printer by support and guide means, to be movable along the central axis of the drum, so that the printing drum is movable between the printing position inside the machine body and a draw-out position outside the machine body. When the printing drum of the above-mentioned drum unit is set at the printing position inside the machine body, a shaft member on the printing drum projecting from an end wall of the printing drum coaxially to the central axis thereof coaxially engages into a mating hole of a drive shaft provided on the machine body, so that the printing drum is driven by a drive source provided in the machine body. Ever since, as such an axially engageable and disengageable drive means between the printing drum and the drive source of the machine body, it has been more widely adopted to provide a first spur or helical gear wheel on the printing drum, while providing a second spur or helical gear wheel on the machine body to be driven by a drive source, so that the first and second spur or helical gear wheels are meshed with one another when the printing drum is set at the printing position, thereby driving the printing drum by the drive source through the meshing engagement of those gear wheels.

With respect to such a couple of engageable/disengageable gear wheels for driving a printing drum based upon the parallel meshing engagement between the spur or helical gear wheels on the printing drum and the machine body, respectively, in order to ensure that, when the printing drum is returned into the machine body after having been drawn out of the machine body for an inspection, maintenance or color change, the gear wheel on the printing drum is engaged with the gear wheel on the machine body at a correct relative rotational position therebetween, it has been proposed by Japanese Patent Laid-open Publication 8-39918 to provide a disk at the gear wheel on the printing drum as attached to an end wall thereof facing the machine body, while also providing a disk at the gear wheel on the machine body as attached to an end wall thereof facing the printing drum, with notches being formed in those disks at a position rotationally corresponding to a predetermined relative rotational position between the two gear wheels, so that each of the two gear wheels can axially proceed across each disk of the other gear wheel only through the notched portion in order to enter into the mutual meshing engagement, thereby allowing a disengagement and a reengagement of the gear wheels on the printing drum and the machine body only when the gear wheel of the printing drum is positioned at a predetermined rotational position relative to that of the machine body.

Apart from the above-mentioned printing drum driving construction, in the rotary type stencil printers, a stencil leading end mounting device for clamping a leading edge of a stencil sheet to the printing drum along a generatrix thereof is provided in the printing drum so as to project radially outward from a cylindrical outer circumference of the printing drum, and in this connection, such an operation is required that a back press roller for pressing a print sheet against the rotating printing drum for applying a printing on the print sheet is retracted away from the printing drum when the stencil sheet leading end mounting device traverses in front of the back press roller, to avoid a collision of the stencil sheet leading end mounting device with the back press roller. When such a cyclic biasing of the back press roller is done by a cam adapted to rotate together with the gear wheel for driving the printing drum, it occurs in the rotational phase region where the cam presents a descending contour that the meshing gear wheels for driving the printing drum is inversely driven by the cam, so that the normally driven gear wheel advances relative to the normally driving gear wheel. If there is a substantial backlash in the meshing engagement of the driving and driven gear wheels, a noise will be generated by such a cyclic inversion of the backlash. In view of such a problem, it has been proposed by Japanese Patent Laid-open Publication 8-338500 to provide a gear sector as attached to a side portion of one of the gear wheels for driving the printing drum as a means for suppressing a reversal of the backlash.

SUMMARY OF THE INVENTION

Starting from the above-mentioned prior art, in constructing a gear wheel having two axial portions laid over one another for the purpose of suppressing the reversal of the backlash in the gear wheels for driving the printing drum, or further, in pursuing a higher stabilization of the rotating speed of the printing drum over the whole phase of rotation thereof indispensable to obtain a higher minuteness of the stencil print image, it is a primary object of the present invention to effectively utilize the double layered construction of the gear wheel to provide a couple of gear wheels for driving a printing drum capable to engage and disengage according to parallel axial movements relative to one another, by which it is ensured that the gear wheel on the printing drum is disengaged from and re-engaged with the gear wheel on the machine body only when the relative rotational position therebetween is at a predetermined rotational position.

According to the present invention, the above-mentioned primary object is accomplished by a couple of gear wheels for driving a printing drum, comprising a first gear wheel mounted to the printing drum, and a second gear wheel rotatably supported by a part of a machine body, the first and second gear wheels being adapted to mesh with one another when the printing drum is set at a printing position located inside the machine body so as to drive the printing drum by a drive source provided in the machine body via the meshing engagement thereof, and to cancel the meshing engagement when the first gear wheel is axially moved together with the printing drum toward outside of the machine body, the first and second gear wheels being either of a same diameter as one another or one being integer times larger than another, the first and second gear wheels having each first and second axial portions, the first axial portions being closer to the printing drum than the second axial portions, while the second axial portions being closer to the part of the machine body than the first axial portions, the first and second axial portions being each formed as either a spur gear or a helical gear with a shifting of phase between the first and second axial portions of each of the first and second gear wheels, wherein, with respect to those gear teeth of the first and second gear wheels which are due to be in a meshing engagement with one another when the first and second gear wheels are at a predetermined rotational relationship relative to one another, the first and second gear wheels have each a tooth shape aligned through the first and second axial portions thereof, so that the first and second gear wheels can axially get into and out of the meshing engagement for allowing the printing drum to move into and out of the printing position.

In the couple of gear wheels of the above-mentioned construction, with respect to those gear teeth of the first and second gear wheels which are due to be in a meshing engagement with one another when the first and second gear wheels are at a predetermined rotational relationship relative to one another, the tooth shape aligned through the first and second axial portions may be pitched according to teeth of the first axial portion.

Or, alternatively, in the couple of gear wheels of the above-mentioned construction, with respect to those gear teeth of the first and second gear wheels which are due to be in a meshing engagement with one another when the first and second gear wheels are at a predetermined rotational relationship relative to one another, the tooth shape aligned through the first and second axial portions may be pitched according to teeth of the second axial portion.

Further, in the couple of gear wheels of the above-mentioned construction, with respect to those gear teeth of the first and second gear wheels which are due to be in a meshing engagement with one another when the first and second gear wheels are at a predetermined rotational relationship relative to one another, the teeth of the second axial portion of the second gear wheel may be substantially removed.

Or, alternatively, in the couple of gear wheels of the above-mentioned construction, with respect to those gear teeth of the first and second gear wheels which are due to be in a meshing engagement with one another when the first and second gear wheels are at a predetermined rotational relationship relative to one another, the teeth of the first axial portion of the first gear wheel may be substantially removed.

Further, in the couple of gear wheels of the above-mentioned construction, the first axial portions of each of the first and second gear wheels may have a larger axial length than the second axial portion thereof.

Or, alternatively, in the couple of gear wheels of the above-mentioned construction, the second axial portion of each of the first and second gear wheels may have a larger axial length than the first axial portion thereof.

Further, in the couple of gear wheels of the above-mentioned construction, the meshing engagement between the first and second gear wheels at the second axial portions thereof may be to suppress a backlash in the meshing engagement between the first and second gear wheels at the first axial portions thereof from reversing.

Or, alternatively, in the couple of gear wheels of the above-mentioned construction, the meshing engagement between the first and second gear wheels at the first axial portions thereof may be to suppress a backlash in the meshing engagement between the first and second gear wheels at the second axial portions thereof from reversing.

Further, in the couple of gear wheels of the above-mentioned construction, a first part of at least one of the first and second axial portions of at least one of the first and second gear wheels may be adjustable of a rotational position thereof relative to the other of the first and second axial portions for a fine adjustment, the first part excluding a second part thereof bearing those gear teeth of one of the first and second gear wheels which are in a meshing engagement with one another when the first and second gear wheels are at the predetermined rotational relationship relative to one another.

By either one of the couple of gear wheels of the above-mentioned construction, a highly stabilized uniform torque transmission is available for driving the printing drum via an axially engageable and disengageable meshing of a couple of gear wheels each having a duplicate gear construction capable of suppressing a backlash in the gear meshing therebetween, while ensuring that, when the printing drum drawn out of the printing position inside the machine body for the purpose of inspection, maintenance, color change, etc. is remounted to the printing position, the rotational relationship between the printing drum and the printing drum driving system in the machine body is always set at a predetermined condition.

BRIEF DESCRIPTION OF THE DRAWINGS

In the accompanying drawings.

DESCRIPTION OF THE EMBODIMENTS

In the following, the present invention will be described in more detail with respect to the embodiments thereof by referring to the accompanying drawings.

Figure 1:
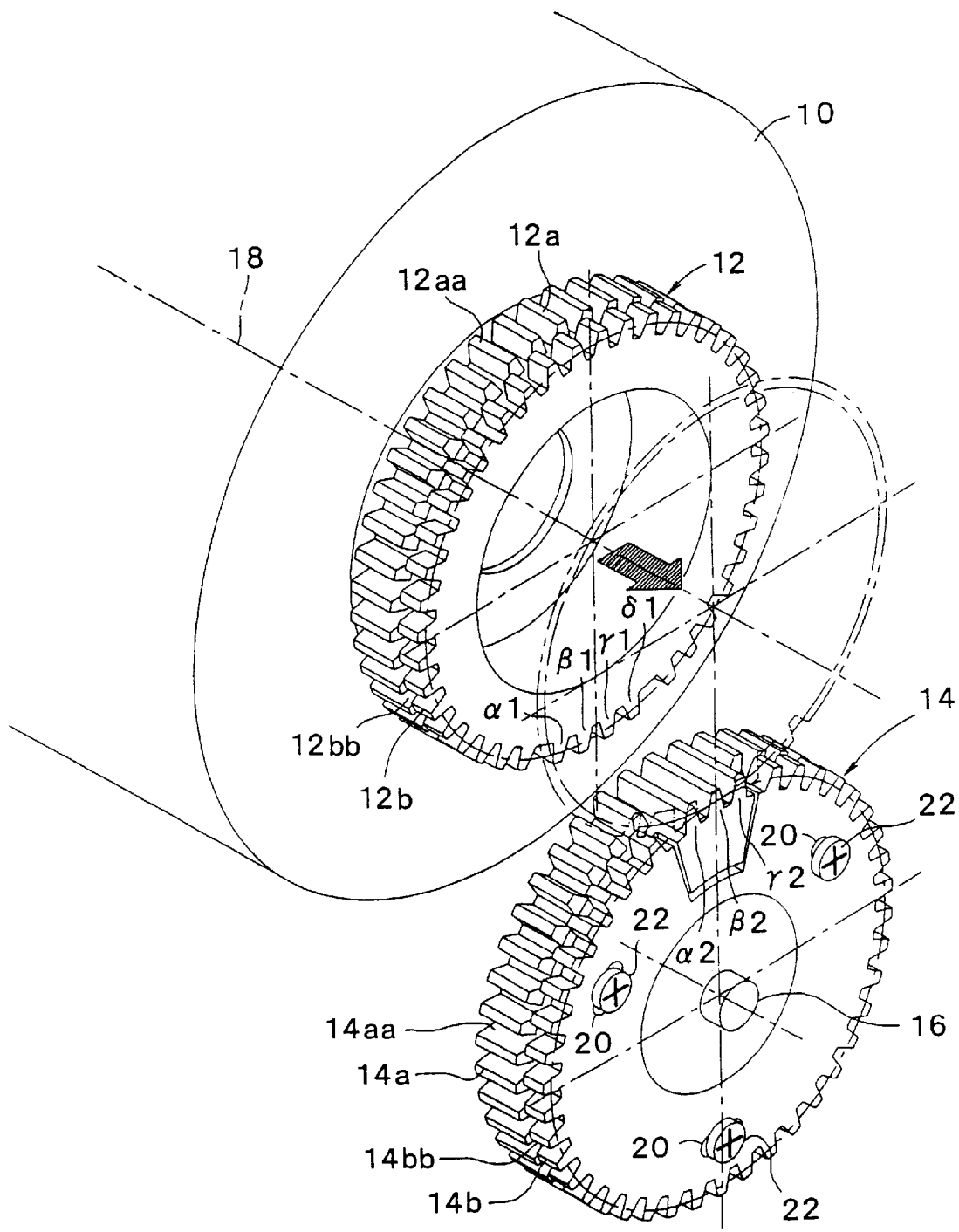
FIG. 1 is a perspective view showing an embodiment of a couple of engageable/disengageable gear wheels for driving a printing drum according to the present invention, the illustration being only with regard to an essential portion thereof.

Referring to FIG. 1 showing essential portions of a first embodiment of a couple of gear wheels for driving a printing drum, 10 is a printing drum, at an end of which is coaxially mounted a first gear wheel 12 on the printing drum. 14 is a second gear wheel on the machine body not shown in the figure. The gear wheel 14 is rotatably mounted by a shaft 16 extended from a supporting part of the machine body of a stencil printer, the supporting part of the machine body being positioned on the side of the gear wheel 14 closer to the viewer as viewed in the figure. The printing drum 10 is movable by a frame and a support and guide means not shown in the figure along the central axis 18 of the printing drum between a printing position inside the machine body and a drawn out position outside the machine body, so that, when the printing drum is set at the printing position, the gear wheel 12 is laid over the gear wheel 14 along the thickness thereof, as shown in FIG. 2 when viewed in the direction of the central axes of the gear wheels.

The gear wheel 12 has a first axial portion 12a bearing a spur gear 12aa on the side closer to the printing drum and a second axial portion 12b bearing a spur gear 12bb on the side closer to the part of the machine body supporting the gear wheel 14. Similarly, the gear wheel 14 on the machine body has a first axial portion 14a bearing a spur gear 14aa on the side closer to the printing drum and a second axial portion 14b bearing a spur gear 14bb on the side closer to the supporting part of the machine body. The gear wheels 12 and 14 are of a same diameter as one another, or more precisely, the pitch circle of the spur gear 12aa and the pitch circle of the spur gear 14aa are of a common diameter, while the pitch circle of the spur gear 12bb and the pitch circle of the spur gear 14bb are of a common diameter. In the embodiment shown in FIGS. 1 and 2, the spur gear 12aa and the spur gear 12bb are of a common diameter, although there is a difference in the rotational phase of the two gears corresponding to a half of the pitch angle of the gear teeth. Similarly, the spur gear 14aa and the spur gear 14bb are of a common diameter, although there is a difference in the rotational phase of the two gears corresponding to a half of the pitch angle of the gear teeth. However, these conditions are met with respect to the gear teeth excluding several gear teeth position in the meshing area when the gear wheels 12 and 14 are meshing at a predetermined rotational relationship relative to one another with the printing drum 10 being positioned at a corresponding predetermined rotational position. As is described hereinbelow, the gear teeth in the above-mentioned meshing area corresponding to the predetermined relative rotational position of the gear wheels are formed to satisfy a special condition. Although in the shown embodiment two gear wheels 12 and 14 are of a common diameter, one of them may have a diameter which is integer times as that of the other, so that the gear train is an acceleration of deceleration gear train.

Figure 2:
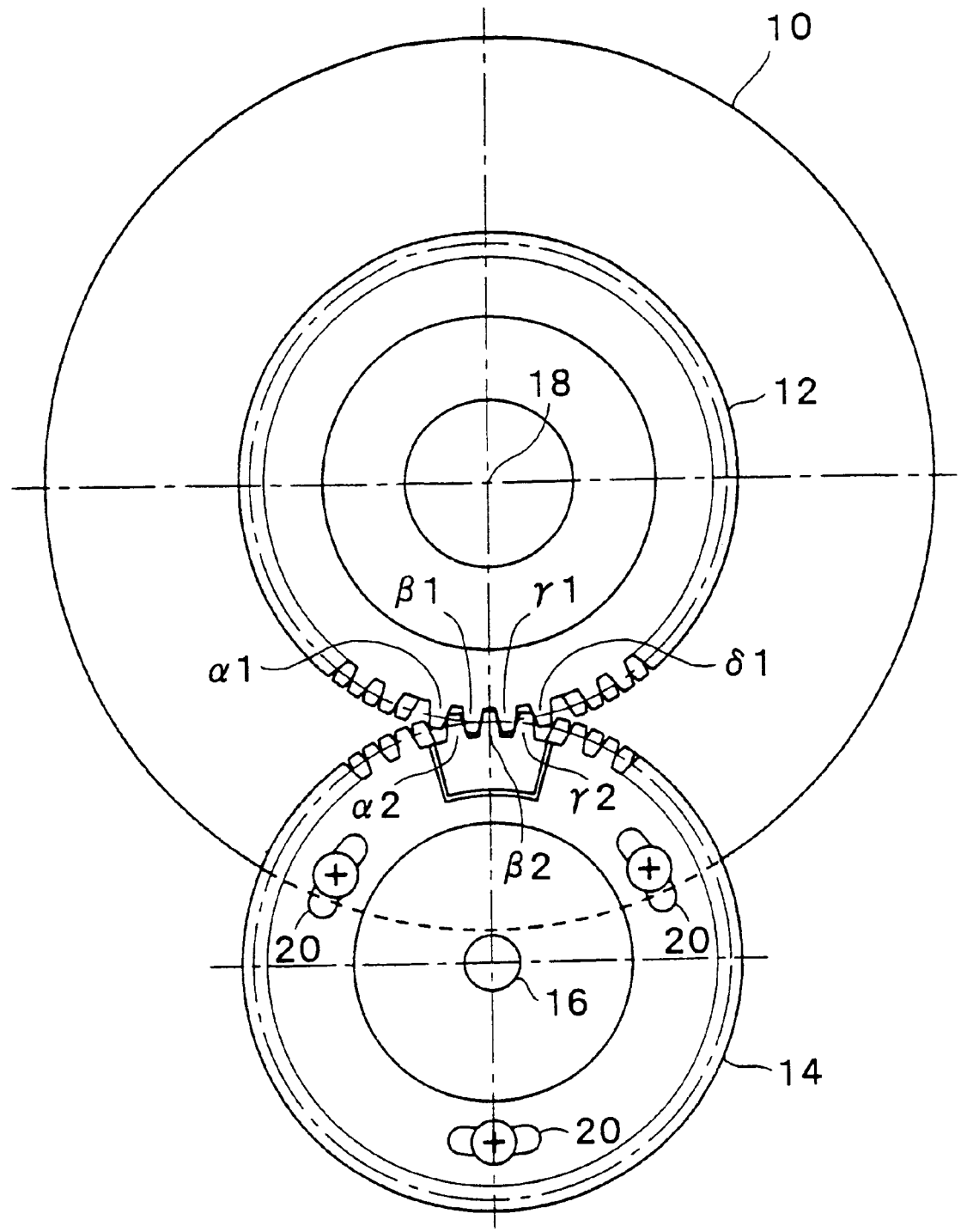
FIG. 2 is an axial view of the couple of gear wheels shown in FIG. 1 in the disengageably meshing state.

Denoting the rotational position of the printing drum and the gear wheels illustrated in FIGS. 1 and 2 as the above-mentioned predetermined relative rotational position, in the mutually meshing area the spur gear 12bb of the gear wheel 12 is modified to align with the spur gear 12aa. The part of the spur gear 12bb at which the tooth shape is modified is shown by teeth α1, β1, γ1 and δ1.

Similarly, in the gear wheel 14 some teeth of the spur gear 14bb in the above-mentioned predetermined meshing area are modified in the tooth shape, so as to align with the spur gear 14aa, as designated by α2, β2 and γ2. As will be more clear in FIG. 1, the gear teeth α2, β2 and γ2 are aligned with the gear 14aa as formed integral therewith. Although not seen in FIG. 1, the gear teeth δ1, β2, γ1 and δ1 of the gear wheel 12 are also aligned with the gear 12aa as formed integral therewith and continuous over the first and second axial portions. Further, in the shown embodiment, the second axial portion 14b of the gear wheel 14 is constructed by a disk member separate from the first axial portion 14a, the disk member being formed with a notch at a portion thereof and fastened to the first axial portion 14a by three bolts 22 passed through three arcuately elongated openings 20 formed in the disk member, so that a fine adjustment of the angular phase position of the gear 14bb relative to the gear 14aa is available, except the gear teeth α2, β2 and γ2.

According to the above-mentioned construction, when the gear wheels 12 and 14 are in the predetermined relative rotational position shown in the figure, these gear wheels are axially movable relative to one another between an engaged position in which the first axial portion 12a of the gear wheel 12 lies axially over the first axial portion 14a of the gear wheel 14 so as to mesh therewith, while the second axial portion 12b of the gear wheel 12 lies axially over the second axial portion 14b of the gear wheel 14 so as to mesh therewith, and a disengaged position in which the two gear wheels are axially apart from one another. Further, when the two gear wheels are rotated relative to one another after having been axially laid one over the other to mesh with one another, no axial movement between the gear wheels 12 and 14 is allowed by the interference between the spur gears 12aa and 14bb or the interference between the spur gears 14aa and 12bb. Similarly, starting from a state that the gear wheels 12 and 14 are disengaged in the axial direction, if at least one of the gear wheels 12 and 14 is even slightly rotationally shifted from the shown relative rotational position, even when the spur gear 12bb and the spur gear 14aa can get into meshing with one another, the spur gear 12aa interferes with the spur gear 14aa, or the spur gear 12bb interferes with the spur gear 14bb, prohibiting the two gear wheels from completely axially lying one over the other.

Thus, when the printing drum is drawn out from the printing position toward outside the machine body, it is ensured that the printing drum and the printing drum drive system on the machine body are definitely set at the predetermined relative rotational position, while when the printing drum is remounted to the printing position in the machine body, it is ensured that the printing drum and the printing drum driving system are engaged to establish a correct rotational relationship.

It will be apparent that the embodiment shown in FIGS. 1 and 2 may be modified such that the spur gears 12aa and 14aa and the spur gears 12bb and 14bb meshing with one another are helical gears instead of being spur gears. In such a case, although a small relative rotation occurs between the two gear wheels during the engagement and disengagement, such a temporal relative rotation is definitely cancelled when a reciprocation of disengagement and reengagement was completed.

Figure 3:
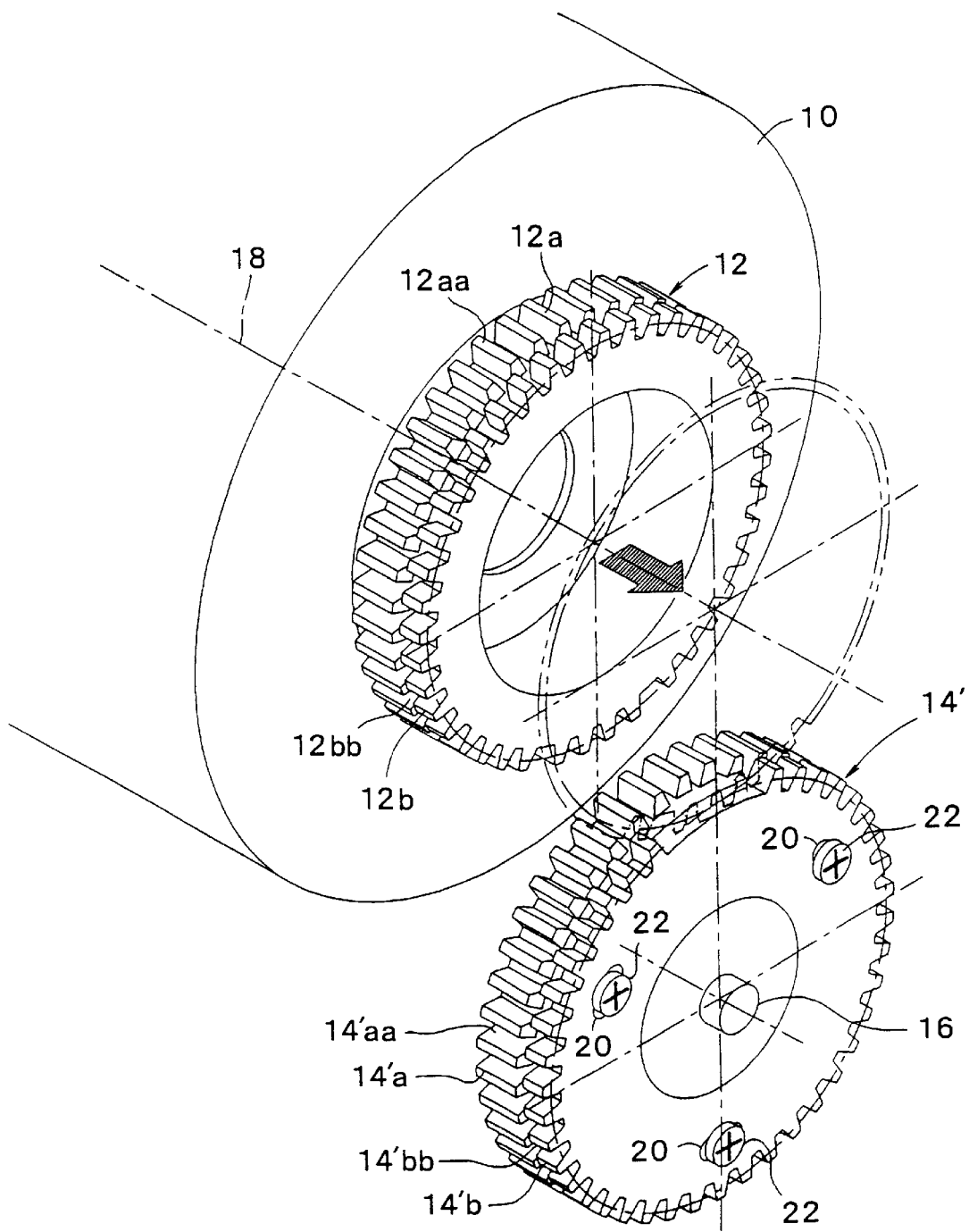
FIG. 3 is a perspective view similar to FIG. 1, showing another embodiment of a couple of engageable/disengageable gear wheels for driving a printing drum according to the present invention.

FIG. 3 is a view similar to FIG. 1, showing a second embodiment of the couple of gear wheels for driving a printing drum according to the present invention. In FIG. 3, the portions corresponding to those shown in FIG. 1 are designated by the same reference numerals.

In this second embodiment, a portion of the spur gear 14'b of the gear wheel 14' corresponding to the gear teeth α2, β2 and γ2 of the spur gear 14b of the gear wheel is removed. Such a construction has an advantage that, when the second axial portion 14'b of the gear wheel 14' is constructed as a disk member separate from the first axial portion 14'a, the manufacture of the gear wheel is easier. In other words, the first axial portion 14'a of the gear wheel 14' need not be made to have a larger thickness at the portion providing the gear teeth α2, β2 and γ2 as in the first embodiment shown in FIG. 1, so that the first axial portion 14'a and the second axial portion 14'b may each be made from a disk member of a constant thickness. Even when the gear teeth α2, β2 and γ2 have been removed as in the second embodiment so that the second axial portion 14'b lacks the corresponding gear teeth, since the gear meshing between the gear wheels 12 and 14' is normally supported by the meshing engagement of the first axial portion 12a of the gear wheel 12 with the first axial portion 14'a of the gear wheel 14', there should occur no substantial degradation of the function of the gear device.

In the embodiments shown in FIGS. 1–3, the axial length of each of the first axial portions 12a and 14a is made larger than that of each of the second axial portions 12b and 14b or 14'b in the gear wheels 12 and 14 or 14', respectively, so that the spur gears 12aa and 14aa provide a primary rotational power transmitting means, while the spur gears 12bb and 14bb or 14'bb provide a backlash suppressing means. However, the positional relationship between the primary rotational power transmitting means and the backlash suppressing means in the gear wheels 12 and 14 or 14' may be reversed to be opposite to that of the embodiments shown in FIGS. 1–3, so that the spur gears 12bb and 14bb or 14'bb closer to the supporting part of the machine body provide the primary rotational power transmitting means, while the spur gears 12aa and 14aa closer to the printing drum provide the backlash suppressing means. In such a modification, the gear shape may be such that, when the gear wheels 12 and 14 or 14' are at the predetermined rotational relationship relative to one another, the spur gears 12aa and 14aa align with the spur gears 12bb and 14bb or 14'bb, respectively. Further, in such a modification, at the portion of the gear wheel 12 where the spur gear 12aa is to align with the spur gear 12bb, a pertinent portion of the spur gear 12aa may be removed. By such a modification, it is also ensured that the printing drum 10 can be drawn out of the machine body from the printing position or restored from outside the machine body to the printing position inside the machine body only when the gear wheels 12 and 14 or 14' are both set at the predetermined relative rotational position.

Figure 4:
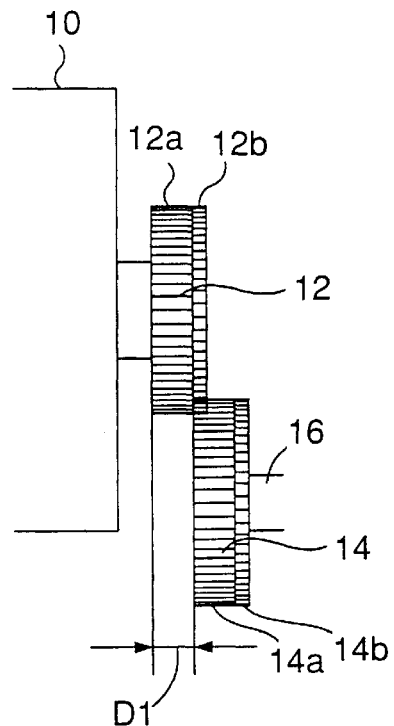
FIG. 4 is a diagrammatic side view showing a process of engaging the couple of gear wheels shown in FIGS. 1 and 2.

FIG. 4 is a diagrammatical side view of a couple of gear wheels for driving a printing drum according to the present invention, in which the axial length of each of the first axial portions 12a and 14a are larger than that of each of the second axial portions 12b and 14b in the gear wheels 12 and 14, respectively, as in the first embodiment shown in FIGS. 1 and 2, illustrating when it is signaled in the process of mounting the printing drum from outside the machine body to the printing position inside the machine body that the rotational position of the printing drum is not at the predetermined rotational position, regardless whether the rotational position of the gear wheel on the machine body is at the predetermined rotational position or not. As shown in the figure, when the printing drum is not correctly rotationally positioned at the predetermined rotational position, when the second axial portion 12b of the gear wheel 12 has been shifted for the meshing with the first axial portion 14a of the gear wheel 14, the printing drum is obstructed from being further shifted, while leaving a relatively large depth D1 required for further shifting of the printing drum, regardless whether the rotational position of the gear wheel 14 is set at the predetermined rotational position or not. Therefore, the incorrectness of the rotational position of the printing drum for the mounting into the machine body is signaled distinctively at a relatively early stage.

Figure 5:
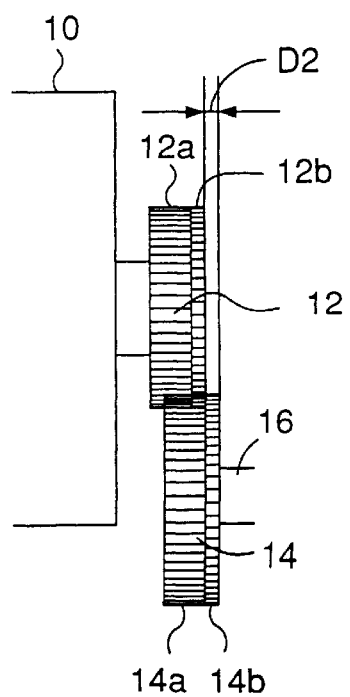
FIG. 5 is a diagrammatic side view showing another process of engaging the couple of gear wheels shown in FIGS. 1 and 2.

In contrast, when the printing drum is correctly set at the predetermined rotational position for the mounting but the printing drum drive system in the machine body is not correctly set at the predetermined rotational position for receiving the printing drum, the gear wheel 12 can be shifted relative to the gear wheel 14 so far as to leave the second axial portion 14b as shown in FIG. 5, where a further shifting of the printing drum is obstructed. In this case, therefore, the incorrectness of the rotational position of the printing drum driving system in the machine body for receiving the printing drum is signaled when the printing drum has been shifted toward its final mounting position so far as to leave a relatively small depth D2.

In any event, by the axial length of the first axial portion being different from that of the second axial portion, when the printing drum can not be mounted to its final mounting position, it can be judged according to whether the depth of shifting of the printing drum left as obstructed is relatively large or small, which of the printing drum and the printing drum driving system in the machine body is not correctly set at the predetermined rotational position, so that the matter is more swiftly attended to.

Figure 6:
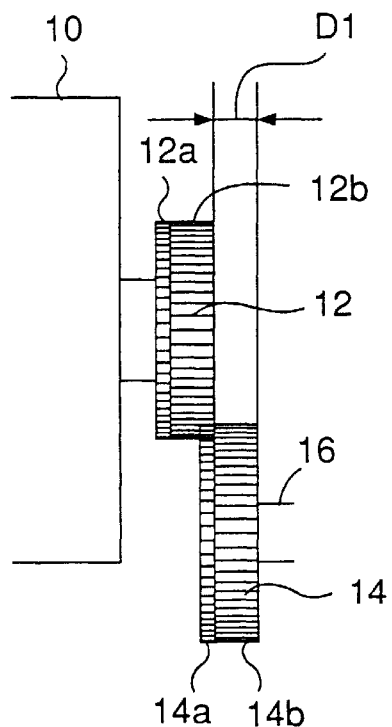
FIG. 6 is a diagrammatic side view similar to FIG. 4 or 5, showing a process of a couple of gear wheels, in which the relationship between the axial length of the first axial portion on the printing drum and that of the second axial portion on the machine body in each of the gear wheels is opposite to that of the embodiment shown in FIGS. 4 and 5.
Figure 7:
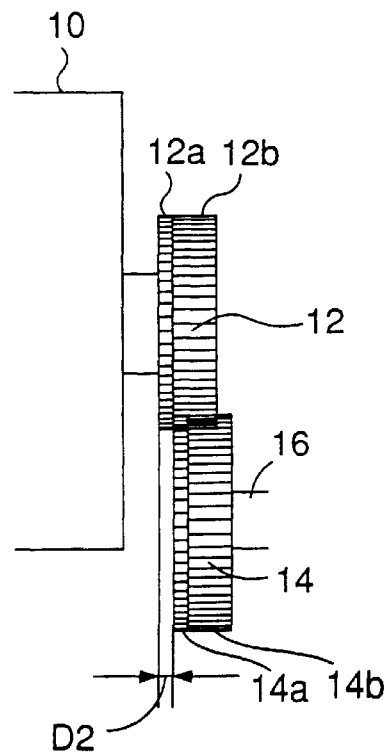
FIG. 7 is a view similar to FIG. 6, showing another process of engaging the couple of gear wheels shown in FIG. 6.

In contrast, when the large/small relationship between the axial lengths of the first and second axial portions of the gear wheels 12 and 14 is opposite to that of the embodiments shown in FIGS. 4 and 5, when the printing drum driving system in the machine body is not correctly set at the predetermined rotational position, the gear wheel 12 is obstructed from a further shifting into the meshing with the gear wheel 14, while leaving a relatively large depth D1 corresponding to the axial length of the second axial portion 14b, as shown in FIG. 6, regardless whether the printing drum is correctly set at the predetermined rotational position or not, thereby signaling that the printing drum driving system in the machine body is not correctly set at the predetermined rotational position for receiving the printing drum.

Further in this embodiment, when the printing drum is not correctly set at the predetermined rotational position, it is signaled by the gear wheel 12 being obstructed from a further shifting in meshing with the gear wheel 14, leaving a relatively small depth D2 corresponding to the axial length of the first axial portion 12a. Therefore, also in this case, it is clearly judged according to whether the depth of shifting left as obstructed in the insertion of the printing drum into the machine body is relatively large or small.

Although the present invention has been described in the above with respect to several embodiments thereof, it will be apparent for those skilled in the art that other various modifications are possible within the scope of the present invention.

We claim:

1. A couple of gear wheels for driving a printing drum of a printing machine having a machine body, comprising a first gear wheel mounted to the printing drum, and a second gear wheel rotatably supported by a part of the machine body, the first and second gear wheels meshing with one another when the printing drum is set at a printing position located inside the machine body so as to drive the printing drum by a drive source provided in the machine body via the meshing engagement between the first and second gear wheels, and to cancel the meshing engagement when the first gear wheel is axially moved together with the printing drum toward outside of the machine body, the first and second gear wheels being either of a same diameter as one another or different in diameter from one another such that one gear wheel is integer times larger than the other gear wheel, the first and second gear wheels having each first and second axial portions, the first axial portions being closer to the printing drum than the second axial portions, while the second axial portions being closer to the part of the machine body than the first axial portions, the first and second axial portions being each formed as either a spur gear or a helical gear with a shifting of phase between the first and second axial portions of each of the first and second gear wheels, the first and second gear wheels having each a particular circumferential portion which are due to be in a meshing engagement with one another when the first and second gear wheels are at a predetermined rotational relationship relative to one another, wherein the second portions of the first and second gear wheels are each one of a tooth shape axially aligned with that of the corresponding first portion and a lack of the teeth exceptionally at the particular circumferential portions thereof, so that the first and second gear wheels can axially move into and out of the meshing engagement for allowing the printing drum to move into and out of the printing position only when the couple of gear wheels are in the meshing engagement with the respective second axial portions thereof aligned with one another at the particular circumferential portions.

2. A couple of gear wheels according to claim 1, wherein the tooth shape of the first and second axial portions of at least one of the first and second gear wheels is pitched according to teeth of the first axial portion at the particular circumferential portion.

3. A couple of gear wheels according to claim 1, wherein the tooth shape of the first and second axial portions of at least one of the first and second gear wheels is pitched according to teeth of the second axial portion at the particular circumferential portion.

4. A couple of gear wheels according to claim 1, wherein the teeth of the second axial portion of the second gear wheel are substantially removed at the particular circumferential portion.

5. A couple of gear wheels according to claim 1, wherein the teeth of the first axial portion of the first gear wheel are substantially removed at the particular circumferential portion.

6. A couple of gear wheels according to claim 1, wherein the first axial portions of each of the first and second gear wheels has a larger axial length than the second axial portion thereof.

7. A couple of gear wheels according to claim 3, wherein the second axial portion of each of the first and second gear wheels has a larger axial length than the first axial portion thereof.

8. A couple of gear wheels according to claim 6, wherein the first and second gear wheels leave an amount of backlash in the meshing engagement at the first axial portions thereof, while the teeth of the second axial portion of the second gear wheel is shifted relative to the teeth of the first axial portion of the second gear wheel more than the shifting of the teeth of the second axial portion of the first gear wheel relative to the teeth of the first axial portion of the first gear wheel by an additional shifting corresponding to the amount of backlash so that the meshing engagement between the first and second gear wheels at the second axial portions suppresses the backlash in the meshing engagement between the first and second gear wheels at the first axial portions.

9. A couple of gear wheels according to claim 7, wherein the first and second gear wheels leave an amount of backlash in the meshing engagement at the second axial portions thereof, while the teeth of the first axial portion of the second gear wheel is shifted relative to the teeth of the second axial portion of the second gear wheel more than the shifting of the teeth of the first axial portion of the first gear wheel relative to the teeth of the second axial portion of the first gear wheel by an additional shifting corresponding to the amount of backlash so that the meshing engagement between the first and second gear wheels at the first axial portions thereof suppresses the backlash in the meshing engagement between the first and second gear wheels at the second axial portions thereof.

10. A couple of gear wheels according to claim 1, further comprising an adjusting mechanism for adjusting a rotational position of a first part of at least one of the first and second axial portions of at least one of the first and second gear wheels relative to the other of the first and second axial portions for a fine adjustment, the first part excluding a second part thereof corresponding to the particular circumferential portion.

11. A couple of gear wheels according to claim 1, wherein the lack of the teeth at the particular circumferential portion is only the second axial portion of the second gear wheel.

* * * * *